(12) United States Patent
King, Jr.

(10) Patent No.: US 9,585,308 B2
(45) Date of Patent: Mar. 7, 2017

(54) DUST MITIGATING RAKE AND DEVICE FOR CAPTURING DUST FROM A RAKE OR FROM MOVING JOB SITE DEBRIS

(71) Applicant: Skitter & Squirt Adventures, LLC, Missoula, MT (US)

(72) Inventor: Jack Marion King, Jr., Phoenix, AZ (US)

(73) Assignee: Skitter & Squirt Adventures, LLC, Missoula, MT (US)

( * ) Notice: Subject to any disclaimer, the term of this patent is extended or adjusted under 35 U.S.C. 154(b) by 0 days.

(21) Appl. No.: 15/064,154

(22) Filed: Mar. 8, 2016

(65) Prior Publication Data

US 2016/0183747 A1    Jun. 30, 2016

Related U.S. Application Data

(63) Continuation-in-part of application No. 13/691,461, filed on Nov. 30, 2012, now Pat. No. 9,301,664, which is a continuation-in-part of application No. 13/691,408, filed on Nov. 30, 2012, now Pat. No. 8,578,554, which is a continuation-in-part of application No. 13/309,037, filed on Dec. 1, 2011, now abandoned, which is a continuation-in-part of application No. 13/086,334, filed on Apr. 13, 2011, now Pat. No. 8,793,835.

(51) Int. Cl.
| | |
|---|---|
| A01D 7/06 | (2006.01) |
| A47L 7/00 | (2006.01) |

(52) U.S. Cl.
CPC .............. *A01D 7/06* (2013.01); *A47L 7/00* (2013.01); *Y02P 70/171* (2015.11); *Y10T 29/49826* (2015.01); *Y10T 83/207* (2015.04); *Y10T 408/50* (2015.01)

(58) Field of Classification Search
CPC  A01D 7/06; A47L 7/00; Y10T 408/50; Y10T 83/207; Y10T 29/49826; Y02P 70/171
See application file for complete search history.

(56) References Cited

U.S. PATENT DOCUMENTS

| | | | |
|---|---|---|---|
| 841,175 | A | 1/1907 | Phinney |
| 3,066,683 | A | 12/1962 | Pace |
| 3,611,473 | A | 10/1971 | Johnson |
| 3,745,604 | A | 7/1973 | Fitzwater |
| 3,766,596 | A | 10/1973 | Clewett |
| 3,878,582 | A | 4/1975 | Hukuba |
| 3,895,407 | A | 7/1975 | Parise |
| 3,992,748 | A | 11/1976 | Howard et al. |
| 4,143,441 | A * | 3/1979 | Brooks .................... A47L 9/02 15/369 |

(Continued)

*Primary Examiner* — David Redding
(74) *Attorney, Agent, or Firm* — Lisa Foundation Patent Law Clinic at ASU

(57) ABSTRACT

A dust mitigating device is provided for use in debris handling. A dust mitigating device may comprise a rake having a head and a first axis, a collection head coupled to the rake, and an exit passage in fluid communication with the collection head. The collection head comprises a suction port and has a second axis. The collection head is configured to align with the head of a rake such that the second axis substantially parallel with the first axis and proximate the first axis. The exit passage is configured to couple to a negative pressure source.

19 Claims, 9 Drawing Sheets

(56) References Cited

U.S. PATENT DOCUMENTS

| | | |
|---|---|---|
| 5,437,078 A | 8/1995 | Courcelles |
| 6,017,400 A | 1/2000 | Clark et al. |
| 8,387,203 B2 * | 3/2013 | Holtby .................... B08B 1/00 134/21 |
| 2006/0026790 A1 | 2/2006 | Consilvio |
| 2011/0296644 A1 | 12/2011 | Grassman |

* cited by examiner

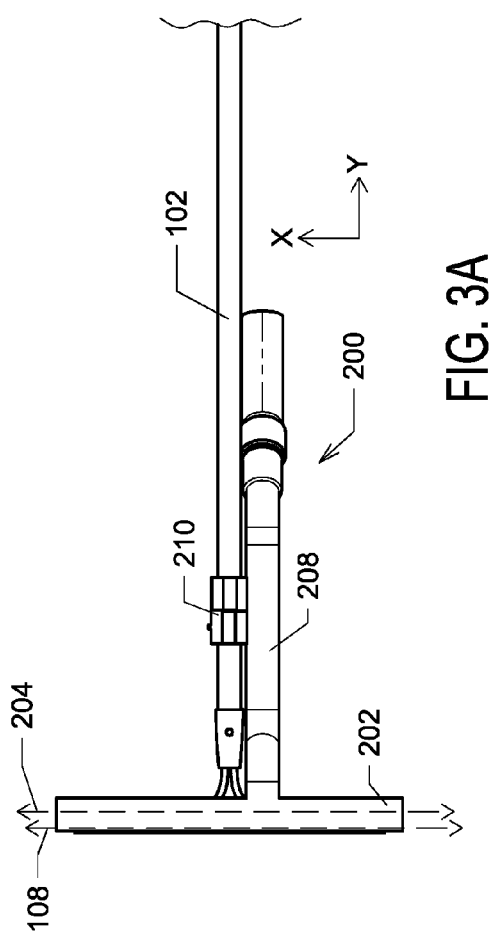
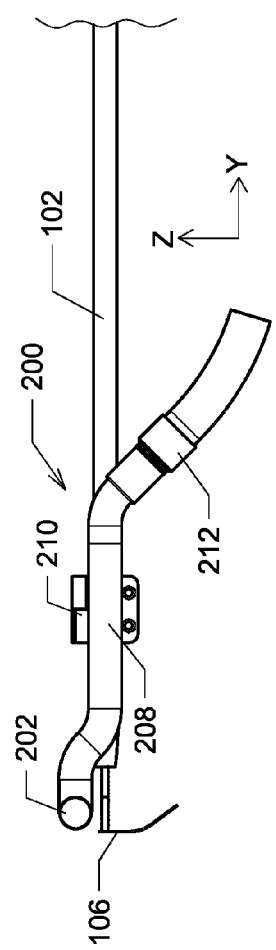

DUST MITIGATING RAKE AND DEVICE FOR CAPTURING DUST FROM A RAKE OR FROM MOVING JOB SITE DEBRIS

CROSS REFERENCE TO RELATED APPLICATIONS

This application is a continuation-in-part of application Ser. No. 13/691,461, filed 30 Nov. 2012, which is a continuation-in-part of Ser. No. 13/691,408, filed 30 Nov. 2012 which is a continuation-in-part of application Ser. No. 13/309,037, filed 1 Dec. 2011, which is a continuation-in-part of application Ser. No. 13/086,334, filed 13 Apr. 2011.

FIELD

The present disclosure relates to debris handling, and more specifically dust capture during debris handling.

BACKGROUND

Floor tile removal generates significant debris and dust. Collecting debris for removal often involves material handling which further compounds the amount of dust generated. The health of those in the area is negatively affected by the dust and environmental regulations in certain areas prohibit the escape of dust generated during debris removal.

SUMMARY

In various embodiments, a dust mitigating device comprises a rake having a head and a first axis; a collection head coupled to the rake, the collection head comprising a suction port and having a second axis; an exit passage in fluid communication with the collection head and configured to couple to a negative pressure source, wherein the collection head is configured to align with the head of a rake such that the second axis is substantially parallel with the first axis and proximate the first axis.

In various embodiments, a dust mitigating device may further comprise a coupling wherein the coupling is configured to removably couple the dust mitigating device to the rake. In various embodiments, the collection head comprises a plurality of suction ports along the second axis. In various embodiments, the rake further comprises a shaft and the collection head is held proximate the head by an interference between the coupling and the shaft. In various embodiments, the coupling further comprises a hinge. In various embodiments, the exit passage further comprises an intermediate passage in fluid communication with the exit passage and the collection head. In various embodiments, the intermediate passage further comprises a suction port. In various embodiments, the collection head comprises at least one of steel, stainless steel, aluminum, aluminum alloy, plastic, or composite.

In various embodiments, a dust mitigating rake comprises a first shaft configured to pass dust therethrough comprising a plurality of solid tines and a suction port opening into the interior of the first shaft; a second shaft having a first end, wherein the second shaft is coupled substantially perpendicular to the first shaft at the first end; and an exit passage configured to couple to a negative pressure source and in fluid communication with the interior of the first shaft.

In various embodiments, the second shaft comprises a passage configured to pass dust therethrough and in fluid communication with the interior of the first shaft. In various embodiments, the second shaft comprises a handle configured to translate along the second shaft with respect to the first end. In various embodiments, the handle comprises a clamp ring. In various embodiments, the solid tine comprises a blunt tip. In various embodiments, the solid tine is configured to be removably coupled to the first shaft. In various embodiments, the first shaft further comprises a longitudinal axis, wherein the plurality of solid tines run along the longitudinal axes and extend from the first shaft perpendicular to the longitudinal axis. In various embodiments, the suction port is proximate a tine. In various embodiments, the first shaft comprises at least one of steel, stainless steel, aluminum, aluminum alloy, plastic, or composite.

In various embodiments, a method of manufacturing a dust mitigating rake comprises forming a first shaft having a an interior configured to pass dust therethrough and forming a suction port into the interior, coupling a plurality of solid tines to the first shaft, coupling a second shaft perpendicular to the first shaft, forming an exit passage such that the exit passage and the interior of the first shaft are in fluid communication, and configuring the exit passage to couple to a negative pressure source. In various embodiments, the method may further comprise coupling a handle to the second shaft and configuring the handle to translate along the second shaft.

BRIEF DESCRIPTION OF THE DRAWINGS

FIG. 3A illustrates the alignment between a dust mitigating device and a rake along the X-Y plane, in accordance with various embodiments;

FIG. 3B illustrates the alignment between a dust mitigating device coupled to a rake and a rake along the Z-Y plane, in accordance with various embodiments;

Figure 1:
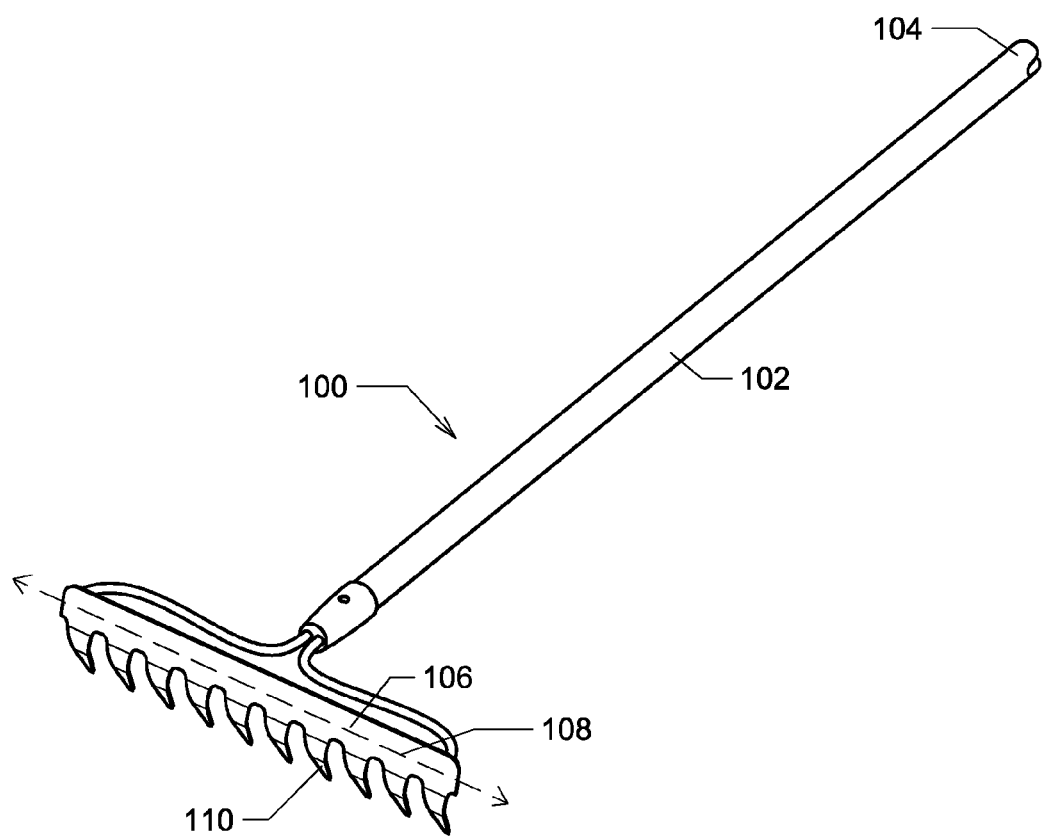
FIG. 1 illustrates a rake in accordance with various embodiments.

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

In various embodiments, a rake comprises a head shaft having a head comprising tines and a first axis perpendicular to the shaft. A dust mitigating device may comprise a rake coupled with a collection head aligned to the rake head. A collection head may comprise a suction port, an exit passage, and a coupling. The suction port may comprise a plurality of ports. The exit passage may be configured to couple to a negative pressure source. The coupling may comprise a hinge and may be configured to removably couple the collection head to the rake. An operator may draw the rake across a floor to gather debris. Action of the rake on the floor and moving the debris tends to generate dust. Dust is drawn into the interior of the collection head through the suction port in response to negative pressure at the exit passage thereby tending to mitigate the generation of dust.

With reference now to FIG. 1, in various embodiments a rake 100 may comprise a shaft 102 having a butt 104 and a head 106 opposite the butt. Head 106 has tines 110 and a first axis 108.

Figure 2:
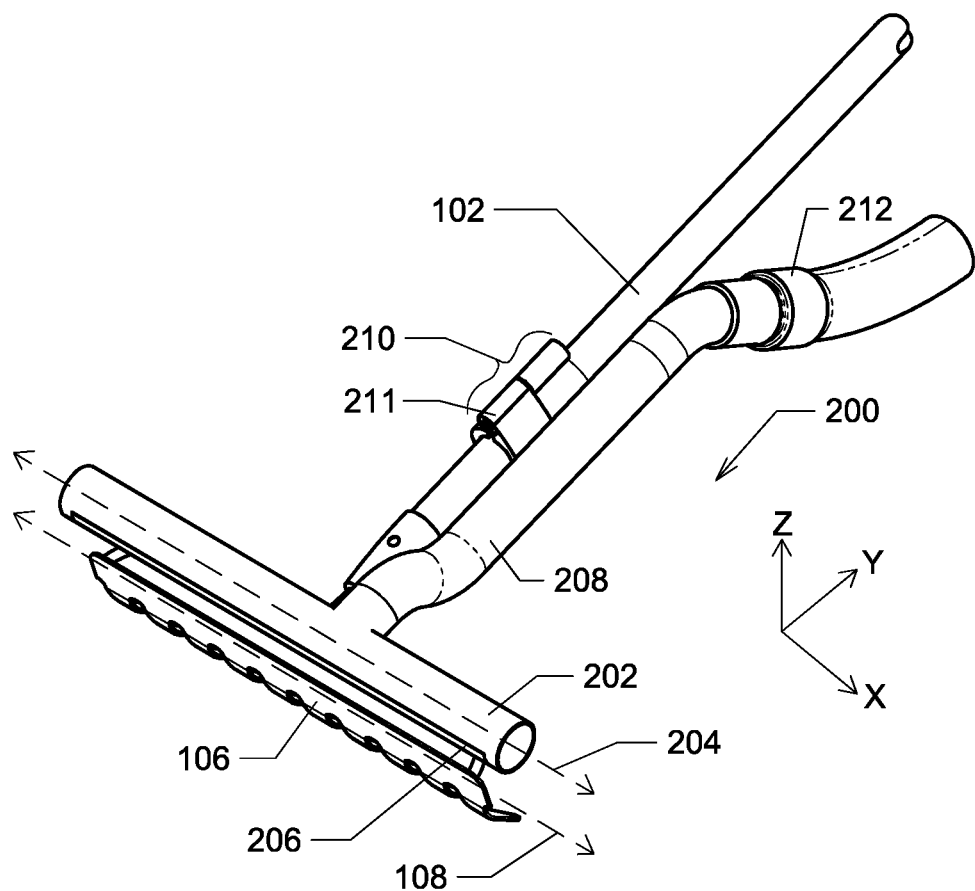
FIG. 2 illustrates a dust mitigating device, in accordance with various embodiments.

In various embodiments and with reference now to FIG. 2, a dust mitigating device 200 comprises a rake such as rake 100, collection head 202, coupling 210, and exit passage 208. Collection head 202 has second axis 204 and comprises suction port comprising a slit 206. Exit passage 208 is configured to couple to a negative pressure source 212, such as a vacuum hose, and is in fluid communication with collection head 202 such that dust may be drawn into an interior volume of the collection head 202 through suction port 206. Coupling 210 comprises hinge 211 which allows collection head 202 to be removably coupled to a rake 100.

With reference now to FIGS. 3A and B, in various embodiments collection head 202 is configured to align with the head of a rake, such as rake 100. Second axis 204 is aligned proximate (along the y-axis) to a first axis such as first axis 108 of the head of a rake. First axis 108 is substantially parallel second axis 204. Collection head 202 is positioned relatively above (along the z-axis) the head such as head 106 of a rake. Collection head 202 is held proximate the head of a rake such as head 106 and prevented from translating along the y-axis away from head 106 by an interference between coupling 210 and the shaft of a rake such as shaft 102.

In various embodiments a dust mitigating device such as device 200 may comprise at least one of steel, stainless steel, aluminum, aluminum alloy, plastic, or a composite. In various embodiments a dust mitigating device may be heat treated or surface treated.

Figure 4:
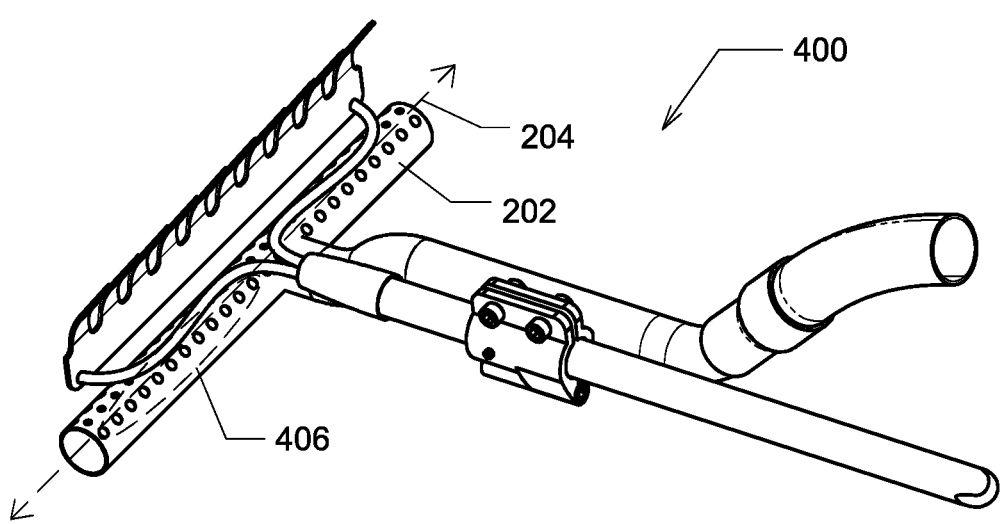
FIG. 4 illustrates a dust mitigating device, in accordance with various embodiments.

With reference now to FIG. 4, in various embodiments, a dust mitigating device 400 may comprise collection head 202 with second axis 204. Collection head 202 comprises a plurality of suction ports 406 along second axis 204. The plurality of suction ports 406 run substantially parallel to each other. In various embodiments, the plurality of suctions ports 406 are arranged in a plurality of rows that each run substantially parallel to the second axis 204 such as by non-limiting example, the plurality of rows is configured into three rows of suction ports as shown in FIG. 4.

Figure 5:
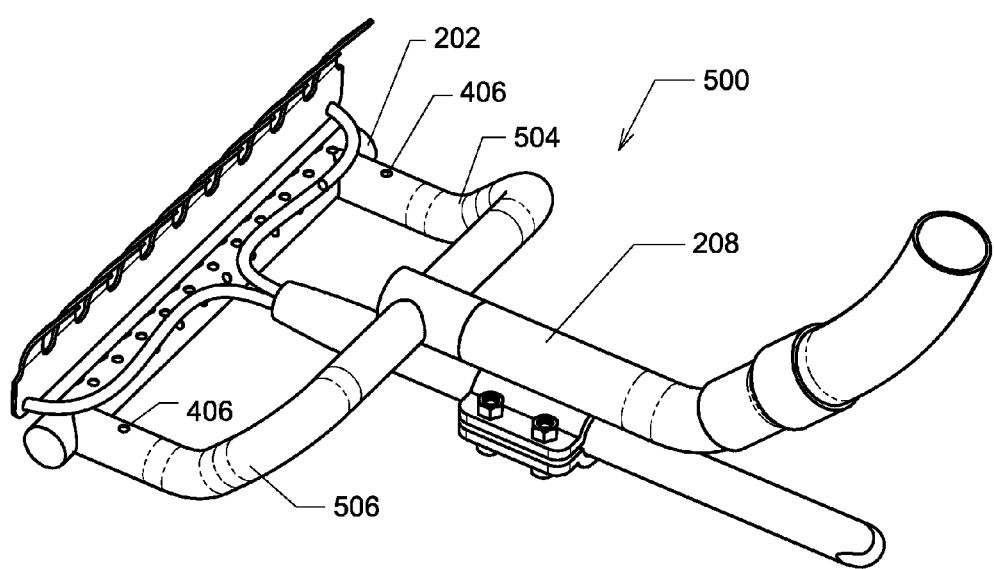
FIG. 5 illustrates a dust mitigating device, in accordance with various embodiments.

With reference now to FIG. 5, in various embodiments a dust mitigating device 500 may comprise collection head 202 and exit passage 208. Exit passage 208 further comprises a first intermediate passage 504 having a suction port 406 and a second intermediate passage 506 having a suction port 510. First intermediate passage 504 and second intermediate passage 506 are in fluid communication with collection head 202 and exit passage 208 such that dust may be drawn into the exit passage 208 through collection head 202, suction ports 406.

In various embodiments, a dust mitigating rake may comprise a first shaft, a second shaft coupled at a first end of the second shaft perpendicular to the first shaft, and an exit passage in fluid communication with the interior of the first shaft configured to couple to a negative pressure source. In various embodiments, the coupling between the first shaft and the second shaft may be buttressed. The first shaft may comprise a plurality of solid tines, a load beam, and a suction port opening into the interior of the first shaft. The second shaft may further comprise a handle coupled to the second shaft. In various embodiments the handle may be coupled by a clamp ring which tends to allow the handle to translate along the second shaft. An operator may draw the dust mitigating rake across a floor to gather debris. Action of the rake on the floor and moving the debris tends to generate dust. Dust is draw into the interior of the first shaft through the suction port in response to negative pressure at the exit passage thereby tending to mitigate the generation of dust.

Figure 6A:
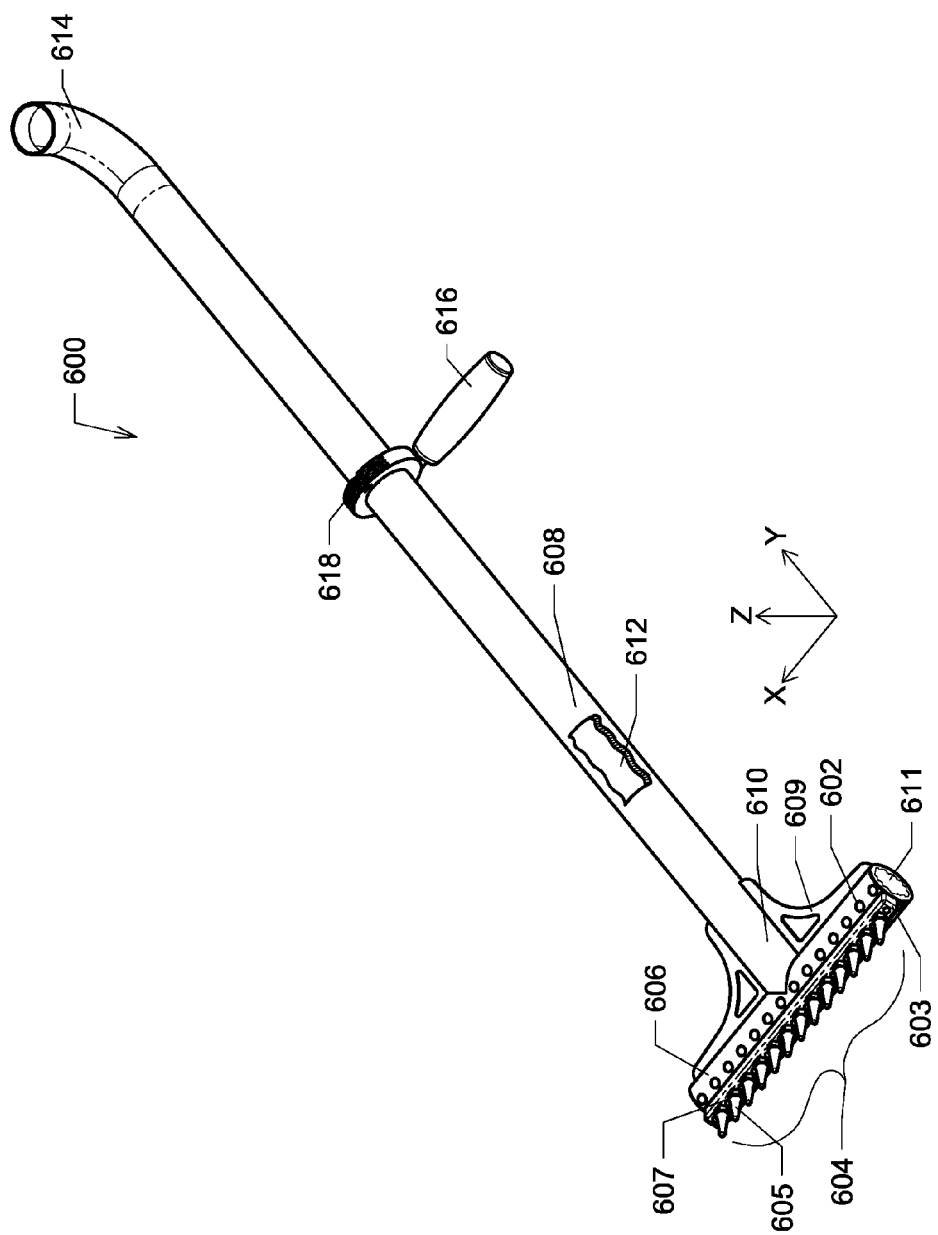
FIG. 6A. illustrates a dust mitigating rake, in accordance with various embodiments.
Figure 6B:
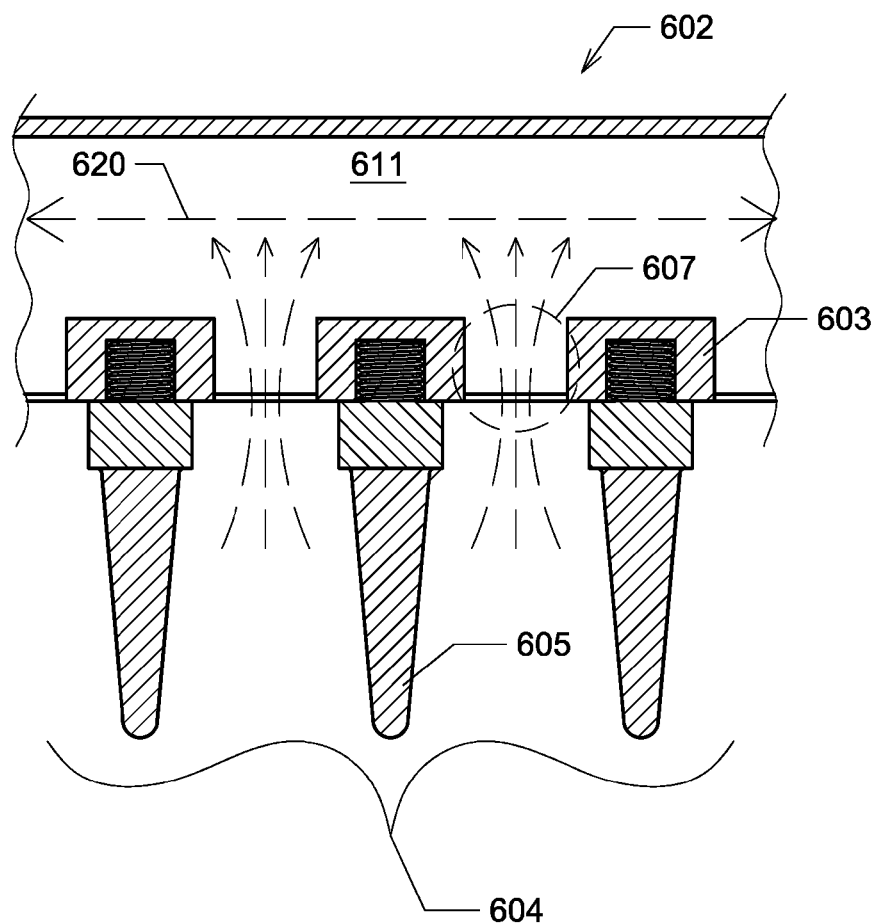
FIG. 6B illustrates a section through the first shaft of a dust mitigating rake, in accordance with various embodiments.

In various embodiments and with reference now to FIGS. 6A and 6B, a dust mitigating rake 600 may comprise a first shaft 602, a second shaft 608, and an exit passage 614. First shaft 602 comprises a plurality of solid tines 604, a load beam 603, and suction ports 606 opening into the interior 611 of the first shaft 602 which is configured to pass dust therethrough. First shaft 602 has longitudinal axis 620. Solid tines 604 run along the first shaft 602 parallel to longitudinal axis 620 and extend laterally from the load beam 603 of first shaft 602 perpendicular to the longitudinal axis 620. Second shaft 608 is coupled at first end 610 perpendicular to the first shaft 602 and supported by buttress 609. Handle 616 is coupled to second shaft 608 by clamp ring 618 which tends to allow handle 616 to translate along the second shaft with respect to first end 610 (along the y-axis). In various embodiments, second shaft 608 comprises an interior 612 configured to pass dust therethrough in fluid communication with the interior 611 of the first shaft 602. Exit passage 614 is configured to couple to a negative pressure source, such as a vacuum, and is in fluid communication with interior 611 via a passage 612 within second shaft 608.

In various embodiments, a solid tine such as solid tine 605 may be removably coupled to a first shaft such as first shaft 602. For example, solid tine 605 is removably coupled to load beam 603 which comprises first shaft 602. In various embodiments a solid tine may be proximate a suction port.

For example, suction port 607 is proximate solid tine 605 and passes through load beam 603 into passage 611.

Dust generated by solid tines such as solid tine 605 is drawn into the interior 611 through suction ports such as suction port 607, as indicated by the dashed arrows, by fluid communication with the negative pressure source. Stated another way, dust is drawn into the interior 611 of first shaft 602 and the interior 612 of the second shaft 608 through suction port 607 in response to a negative pressure at exit passage 614.

Figure 7:
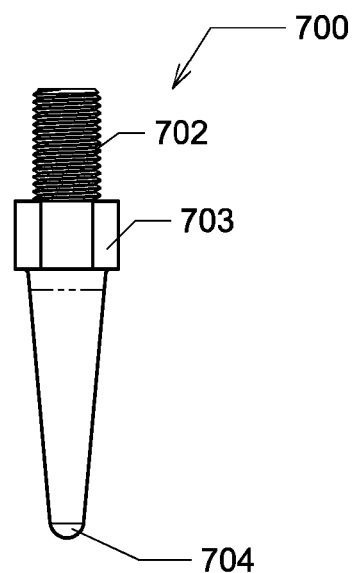
FIG. 7 illustrates a solid tine, in accordance with various embodiments.
Figure 8:
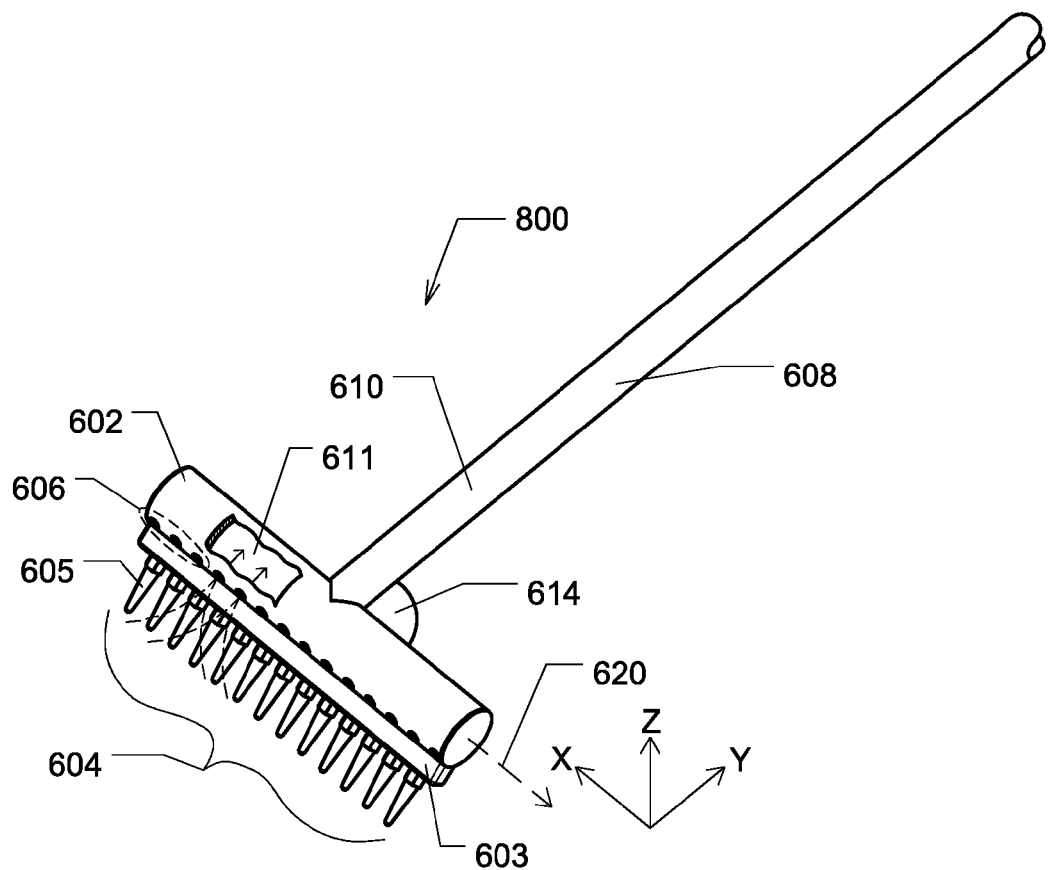
FIG. 8 illustrates a dust mitigating rake, in accordance with various embodiments.

With reference now to FIGS. 6, 7, and 8, in various embodiments a solid tine 700 may comprise a threaded coupling 702 and a nut 703 such that solid tine 700 may be removably coupled to a first shaft, such as first shaft 602 or 802. Solid tine 700 comprises a blunt tip 704 which tends to allow the tine to glide smoothly across a surface without biting into the surface.

In various embodiments and with reference now to FIG. 8, a dust mitigating rake 800 may comprise a first shaft 602, a second shaft 608, and an exit passage 614. First shaft 602 comprises a plurality of solid tines 604, a load beam 603, and suction ports 606 opening into the interior 611 of first shaft 602 which is configured to pass dust thererethrough. First shaft 602 has longitudinal axis 620. Solid tines 604 run along the first shaft 602 parallel to longitudinal axis 816 and extend laterally from the load beam 603 of the first shaft 602 perpendicular to the longitudinal axis 620. Second shaft 608 has first end 610 and is coupled perpendicular to the first shaft 602 at the first end 610. Exit passage 614 is in fluid communication with interior 611 and is configured to couple to a negative pressure source such as a vacuum.

In various embodiments, a solid tine, such as solid tine 605, may be removably coupled to a first shaft such as first shaft 602. For example, solid tine 605 is removably coupled to load beam 603 which comprises first shaft 602.

Dust which may be generated by solid tines, such as solid tine 605, is drawn into the interior, such as interior 611 of a first shaft through suction ports, such as suction ports 606, as indicated by the dashed arrows by fluid communication with a negative pressure source. Stated another way, dust is drawn into the interior 611 of first shaft 802 through suction ports 810 in response to negative pressure at exit passage 806.

In various embodiments, a dust mitigating rake may comprise at least one of steel, stainless steel, aluminum, aluminum alloy, plastic, or composite.

Figure 9:
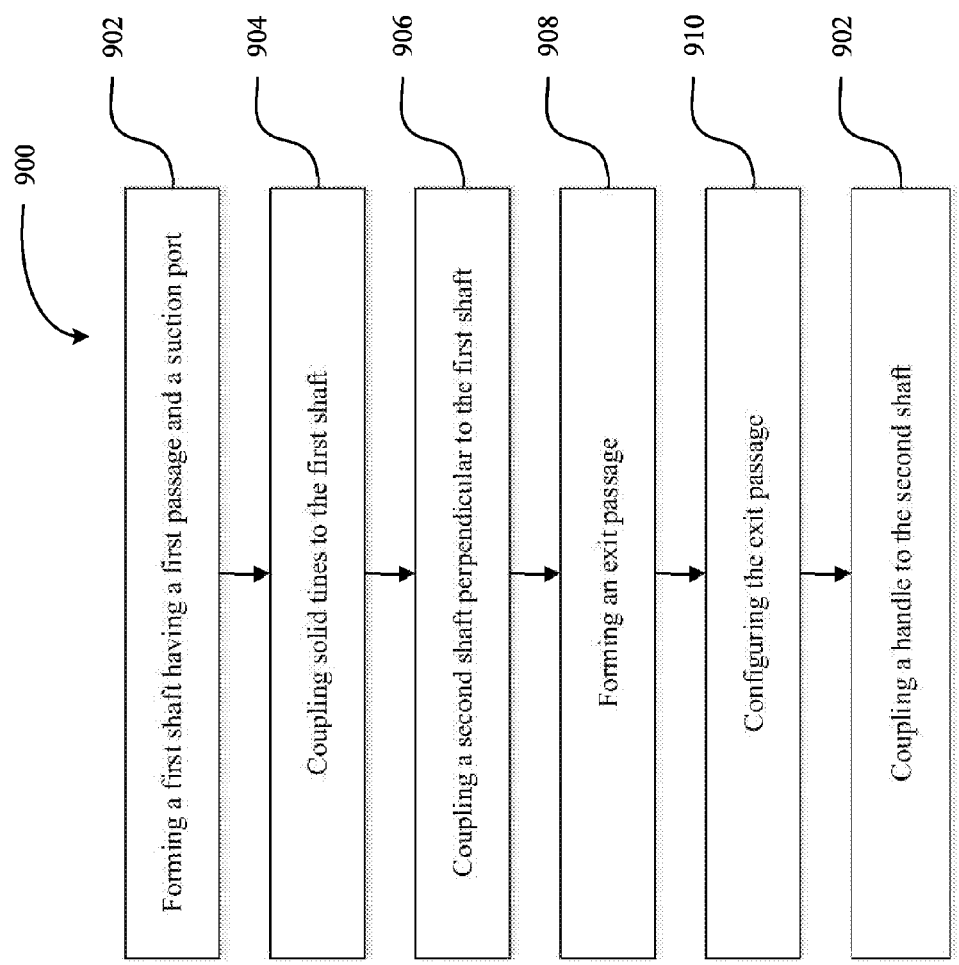
FIG. 9 illustrates a method for manufacturing a dust mitigating rake, in accordance with various embodiments.

In various embodiments as illustrated in FIG. 9, a method 900 of manufacturing a dust mitigating rake may comprise forming a first shaft 902 having an interior configured to pass dust therethrough and forming a suction port into the interior, coupling a plurality of solid tines 904 to the first shaft, coupling a second shaft 906 perpendicular to the first shaft, forming an exit passage 908 such that the exit passage and the first passage are in fluid communication, configuring the exit passage 910 to couple to a negative pressure source. Forming may comprise joining, such as welding or brazing. Forming may also comprise milling or casting or may comprise additive techniques known in the art such as 3D printing. The method may further comprise, coupling a handle 912 to the second shaft and configuring the handle to translate along the second shaft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A dust mitigating device, comprising:
   a rake having a head and a first axis;
   a collection head coupled to the rake, the collection head comprising a plurality of suction ports and having a second axis, wherein the plurality of suction ports are arranged in a plurality of rows substantially parallel to the second axis;
   an exit passage in fluid communication with the collection head and configured to couple to a negative pressure source, wherein the collection head is configured to align with the head of a rake such that the second axis is substantially parallel with the first axis and proximate the first axis.

2. The dust mitigating device of claim 1, further comprising a coupling wherein the coupling is configured to removably couple the collection head and exit passage to the rake.

3. The dust mitigating device of claim 2, wherein the rake further comprises a shaft and the collection head is held proximate the head of the rake by an interference between the coupling and the shaft.

4. The dust mitigating device of claim 2, wherein the coupling further comprises a hinge.

5. The dust mitigating device of claim 2, wherein the exit passage further comprises an intermediate passage in fluid communication with the exit passage and the collection head.

6. The dust mitigating device of claim 5, wherein the intermediate passage further comprises a suction port.

7. The dust mitigating device of claim 1, the collection head comprises at least one of steel, stainless steel, aluminum, aluminum alloy, plastic, or composite.

8. A dust mitigating rake, comprising:
  a first shaft configured to pass dust therethrough comprising a plurality of solid tines and a plurality of suction ports, wherein the plurality of suction ports are arranged in a plurality of rows substantially parallel to the first shaft, opening into the interior of the first shaft;
  a second shaft having a first end, wherein the second shaft is coupled substantially perpendicular to the first shaft at the first end; and
  an exit passage configured to couple to a negative pressure source and in fluid communication with the interior of the first shaft.

9. The dust mitigating rake of claim 8, wherein the second shaft comprises a passage configured to pass dust therethrough and in fluid communication with the interior of the first shaft.

10. The dust mitigating rake of claim 8, wherein the second shaft comprises a handle configured to translate along the second shaft with respect to the first end.

11. The dust mitigating rake of claim 10, wherein the handle comprises a clamp ring.

12. The dust mitigating rake of claim 8, wherein the solid tine comprises a blunt tip.

13. The dust mitigating rake of claim 8, wherein the solid tine is configured to be removably coupled to the first shaft.

14. The dust mitigating rake of claim 8, wherein the first shaft further comprises a longitudinal axis, wherein the plurality of solid tines run along the longitudinal axis and extend from the first shaft perpendicular to the longitudinal axis.

15. The dust mitigating rake of claim 14, wherein the suction port is proximate a tine.

16. The dust mitigating rake of claim 8, wherein the first shaft comprises a load beam.

17. The dust mitigating rake of claim 8, wherein the first shaft comprises at least one of steel, stainless steel, aluminum, aluminum alloy, plastic, or composite.

18. A method of manufacturing a dust mitigating rake comprising:
  forming a first shaft having an interior configured to pass dust therethrough and forming a plurality of suction ports into the interior, wherein the plurality of suction ports are arranged in a plurality rows substantially parallel to the first shaft;
  coupling a plurality of solid tines to the first shaft;
  coupling a second shaft perpendicular to the first shaft;
  forming an exit passage such that the exit passage and the interior of the first shaft are in fluid communication; and
  configuring the exit passage to couple to a negative pressure source.

19. The method of claim 17, further comprising coupling a handle to the second shaft and configuring the handle to translate along the second shaft.

* * * * *